(12) United States Patent
Jones, Jr.

(10) Patent No.: US 6,240,859 B1
(45) Date of Patent: Jun. 5, 2001

(54) CEMENT, REDUCED-CARBON ASH AND CONTROLLED MINERAL FORMATION USING SUB- AND SUPERCRITICAL HIGH-VELOCITY FREE-JET EXPANSION INTO FUEL-FIRED COMBUSTOR FIREBALLS

(75) Inventor: Roger H. Jones, Jr., Reno, NV (US)

(73) Assignee: Four Corners Group, Inc., Reno, NV (US)

( * ) Notice: Subject to any disclaimer, the term of this patent is extended or adjusted under 35 U.S.C. 154(b) by 0 days.

(21) Appl. No.: 09/566,846

(22) Filed: May 5, 2000

(51) Int. Cl.[7] ............................. F23D 1/00; F02G 3/00
(52) U.S. Cl. .................. 110/345; 110/203; 110/215; 110/346; 110/347; 110/348; 431/4; 60/39.05; 60/39.55
(58) Field of Search ................ 431/4, 2 FA, 163, 431/190; 110/203, 345, 346, 347, 348, 215; 106/705, DIG. 1; 60/39.55, 39.05

(56) References Cited

U.S. PATENT DOCUMENTS

| | | | |
|---|---|---|---|
| 3,748,080 | * | 7/1973 | Dunn .......................................... 431/4 |
| 4,036,580 | * | 7/1977 | Reed et al. ............................ 431/202 |
| 4,041,699 | * | 8/1977 | Schelp ................................. 60/39.55 |
| 4,102,125 | * | 7/1978 | Schelp ................................. 60/39.53 |
| 4,625,661 | * | 12/1986 | Melchior ................................ 110/215 |
| 4,706,611 | * | 11/1987 | Nelson ................................ 122/5.5 A |
| 5,000,099 | * | 3/1991 | Dickinson .............................. 110/238 |
| 5,199,255 | * | 4/1993 | Sun et al. ............................. 60/39.02 |
| 5,217,373 | * | 6/1993 | Goodfellow ........................... 432/181 |
| 5,615,627 | * | 4/1997 | Marr, Jr. ................................ 110/346 |
| 5,875,722 | * | 3/1999 | Gosselin, Jr. et al. ................ 110/345 |
| 5,906,806 | * | 5/1999 | Clark .................................... 423/437.1 |
| 5,937,770 | * | 8/1999 | Kobayashi et al. ................... 110/263 |
| 6,085,513 | * | 7/2000 | Hamill et al. ......................... 60/39.05 |
| 6,085,674 | * | 7/2000 | Ashworth .............................. 110/347 |
| 6,090,291 | * | 7/2000 | Akai et al. ............................. 210/669 |
| 6,141,955 | * | 11/2000 | Akiyama et al. ..................... 60/39.15 |

* cited by examiner

Primary Examiner—Denise L. Ferensic
Assistant Examiner—K. B. Rinehart
(74) Attorney, Agent, or Firm—Townsend and Townsend and Crew

(57) ABSTRACT

High-temperature and high-pressure water, preferably at or above supercritical conditions for water, is injected into a high-temperature flame of a fuel combustor such as a coal-fired furnace, or boiler, or a turbine, internal combustion engine, rocket or the like. The process enhances efficiency of the combustion process, and, when used with fuels such as coal, renders ash, particularly fly ash, cementitious, so that it can be used as a substitute for conventional cement, reduces the carbon content of the ash, so that it can be used as a cement additive, and reduces carbon dioxide emissions into the environment.

31 Claims, 3 Drawing Sheets

CEMENT, REDUCED-CARBON ASH AND CONTROLLED MINERAL FORMATION USING SUB- AND SUPERCRITICAL HIGH-VELOCITY FREE-JET EXPANSION INTO FUEL-FIRED COMBUSTOR FIREBALLS

BACKGROUND OF THE INVENTION

The most commonly used hydraulic cement is portland cement, made by burning (calcining) crushed limestone, clay, alumina and silicates until the mass is nearly fused. This material, called clinker, is then combined with gypsum (actually anhydrite—calcium sulfate—$CaSO_4$) and ground into a fine powder. Mixed with water, the pulverulent materials undergo a rapid chemical reaction called hydration (thus the term "hydraulic cement"), forming hydroxide compounds that hydrolyze the silicate components of the mixture into amorphous phases that eventually fuse into a solid mass. Hydraulic cement has been known since ancient times as the primary bonding material that holds together the aggregates in concrete. It is also, for all practical purposes, a form of chemically bonded ceramic.

The preparation of portland cement requires mining, refining and transportation of the various raw materials. These activities consume large amounts of energy and produce substantial quantities of carbon dioxide, as do the calcining and grinding processes. The carbon dioxide so produced is disgorged into the atmosphere, contributing to global warming.

So-called fly ash is co-produced during the burning of coal, wood and many other types of organic or fossilized hydrocarbon fuels as vaporized (gas-phase), incombustible, inorganic contaminants condense to form particles, and these particles then further coagulate to form fine spherical and cenospherical aggregation particulates during the rapid cooling of the flue gas and mineral matter. The condensation occurs in the presence of water vapor from various sources, including combustion, as well as carbon dioxide, nitrogen, nitrogen oxides and sulfur oxides (called $NO_x$ and $SO_x$, respectively). In most commercial combustion programs, the largest fraction of these particulates generally is captured from the flue gas stream in pollution control equipment and transported to specially constructed landfills or returned to the mines from which the coal originated, where they are deposited as waste. If its unburned carbon content is less than 1%, fly ash, being an artificial pozzolan, may be used as a cement additive to reduce the high relative pH of the pore water of concrete made of portland cement and aggregate. This practice is often desirable to prevent or mitigate a reaction (called the Alkali-Silica Reaction or "ASR") between the cement and siliceous aggregates. ASR can cause early concrete deterioration. Fly ash may sometimes also be used as a filler for cast and molded plastics made of catalyzed resins or thermoplastics.

The most desirable types of fly ash for use as a concrete mixture exhibit relatively high reactivity in portland cement. That is, they will bind significant amounts of hydroxide, but not inhibit the rate of cement hydration and, in certain cases, may even accelerate it. This occurs in one of two ways. First, the ash may contain relatively little calcium and/or magnesium oxide, but will express most of its silica content in a glass phase such as an amorphous gehlenite (rather than as crystalline siliceous minerals such as mullite). Second, the ash may contain large proportions of calcium and/or magnesium oxide which, when combined with water, will act as a cementing agent in its own right. To maintain high reactivity it is desirable to have little or no unburned carbon (called Loss On Ignition or "LOI") present in the ash. Crystalline carbon also causes early strength deterioration in cements. Because of its dark color, fly ash with higher LOI content is also undesirable for use as a filler for cast or molded plastics.

Ideally, it would be desirable to produce hydraulic cement or low-carbon/high-amorphous-phase ash without expending additional energy for calcining limestone, for obtaining and transporting raw materials and without releasing the additional carbon dioxide resulting from these activities into the atmosphere. Instead, there would be a process that would transform into useful products the large dusty waste streams produced by commercial solid fuel combustion (e.g., in electric power plants) and that would eliminate reliance upon extraneous materials and energy. The process would be even more desirable if, in its operation, it also increased combustion efficiency.

Like cement kilns, organic- and fossilized-hydrocarbon-fired electric power plants produce sintered inorganic materials: smoke, bottom ash, fly ash, fouling and slag. Such products are considered byproducts and are usually treated as wastes. Often referred to as "dirt-burners" in the electric industry, the combustion units in the boilers of coal-burning plants cause the mineral-matter impurities in the coal feed stream to vaporize into gases or near gases, after which they condense, coagulate and are quenched, transforming them into different minerals in the resulting "ash", much like the limestone/clay/bauxite feedstocks in cement plants are transformed into clinker by burning in cement kilns. In fact, the ashes produced by many electric power plants have chemistry, but not mineralogy, very close to that of portland cement. The result of coal burning is siliceous ash particulates that are later removed from the flue streams by electrostatic precipitators, fabric baghouses or capillary ceramic candle filters. The same can be said of combustors burning wood, rice hulls and other organic fuels.

With the intent that it will pass through the furnace, become calcined into lime, and subsequently act as a sorbent for sulfur oxides in the flue gas to form anhydrite (calcium sulfate—$CaSO_4$), attempts have been made to introduce limestone or lime into coal pulverizers. Although this is effective to a limited extent, particularly in circulating fluidized bed powerplants, the limestone tends to melt, aggregate and clump in the lowest part of the bed at the bottom of the furnace or combustor, where it does not react and is discharged with the bottom ash. As large masses of limestone form, they attract the remaining free lime and form what are, for all practical purposes, metamorphic materials similar to marble, effectively stopping any dry scrubbing before it can start. If the lime were hydrolyzed as soon as it was calcined from limestone, the reaction with the sulfur oxides and the formation of anhydrite particulates in the flue stream would be accelerated, facilitating the dry scnibbing process. In addition to or in place of limestone, high-calcium fly ash has also been added to the coal feed stream with similar results, again, provided hydrolysis occurs.

SUMMARY OF THE INVENTION

Observations of high-pressure, small-volume and high-speed water- and steam-tube leaks in coal-fired boilers demonstrated that profound changes in the elemental composition and mineralogy occurred in the fly ash and other inorganic combustion byproducts. In some instances, fly ash containing little or no calcium or magnesium became self-cementing, and significant color changes were noted as well.

The color and reflectivity of some ash shifted from typically gray or off-white to dark reds and umbers. Other ash became much lighter in color, suggesting that more carbon had been consumed in the combustion process. Shifts in the relative pH of slurries made by combining these materials with deionized water as compared with unaffected ash also indicated significant changes in elemental and mineralogical composition.

These incidental observations motivated experiments based upon injecting water directly into the most volatile and highest temperature zone of the combustion process, the fireball or flame front, itself. Five areas of experimental inquiry were undertaken to determine the effect of using controlled water injection into the fireball to:

1. develop a means of operation which would improve the overall performance of a power plant boiler;
2. deliberately alter the mineral-matter transformation, condensation and coagulation process in an attempt to produce self-cementing (cementitious) fly ash;
3. enhance the thermal efficiency of the combustion process by disassociating the water molecule into electrically charged atomic hydrogen and oxygen, resulting in more complete burning of the carbon portions of the feed stream, and producing more heat from a given quantity of fuel while re-combusting any remaining hydrogen into water;
4. reduce the amount of unburned carbon left in the resulting ash, making the ash more valuable as a cement or plastic additive; and
5. reduce the fraction of undesirable sulfur and nitrogen oxides and particulate carbon (opacity) in the emissions from the power plant boiler and precipitator or other collector.

Controlled variables in the water injection process were the volume of water as a proportion of the combustible components of the fuel, the velocity of the injection free-jet, the temperature, and the pressure. This led to the identification of two distinct regimes of water injection into the fireball, one at sub-critical and the other at supercritical conditions for the water, each with its own range of effects within the five experimental inquiries listed above.

The results of these experiments were nothing short of astonishing. By injecting relatively small amounts of high-temperature and high-pressure water, particularly at or above supercritical conditions for water (approximately 225 $Kg/cm^2$ and 374° C.), the performance of a furnace in terms of its combustion efficiency and generated byproducts was greatly improved. For example, when water under supercritical conditions was injected into the flame in an amount of about 1.5% by weight of the amount of coal used in the combusting step, fly ash formed during combusting became cementitious and, instead of being undesirable waste, it can be profitably used as a cementitious material. Thus, when fly ash obtained as a result of the process of the present invention is mixed with water in an amount between about 30% and 50% by weight of the ash, the resulting mixture will self-cement.

Further, by injecting water at a temperature and pressure above the ambient temperature and pressure, not necessarily at or above supercritical conditions, the carbon content of combustion byproducts, e.g. fly ash, decreased, while the corresponding increase in the amount of carbon that is combusted improved the thermal efficiency of the process. The thermal efficiency of the process is even further enhanced when water molecules were initially split into hydrogen and oxygen and thereafter recombined into water molecules, which was observed as resulting in a net heat gain.

In addition, it was observed that by injecting water at a temperature and pressure above ambient conditions, preferably but not necessarily at or above supercritical conditions, the carbon content of the fly ash was reduced relative to what it is in the absence of injecting water into the flame. The carbon content in the fly ash was lowered to as little as about 1% by weight of the ash. This enhanced the thermal efficiency of the process, as already mentioned, and made the ash useful as a cement additive since the presence of carbon in a cement mixture is undesirable, and more than about 3% (by weight) of carbon in the fly ash makes the fly ash unfit as a cement filler. Thus, the present invention converts fly ash waste, which is costly to properly dispose of, into a revenue-generating byproduct of the combustion process.

The high-temperature and pressure water is injected into the flame through appropriately positioned nozzles as a free-jet at high, e.g. supersonic, speeds (relative to the flame).

It is therefore a purpose of this invention to inject a high-velocity jet or jets of controllable volumes of temperature- and pressure-regulated water directly into the fireball of combustors, in order to produce ash which, in the presence of water, is self-cementing.

Another purpose of this invention is to inject a high-velocity jet or jets of controllable volumes of temperature- and pressure-regulated water directly into the fireball of solid, organic-fuel-fired (e.g. coal, wood or rice hull) combustors, in order to deliberately alter the mineralogy and relative proportions of amorphous and crystalline phases of the coalescing non-combustible mineral-matter aerosols in a controllable manner.

A further purpose of this invention is to disassociate the injection water into hydrogen and oxygen, cause the hydrogen and oxygen to re-combust into water, and release additional energy of combustion.

A further purpose of the invention is to produce a quality artificial pozzolan with a greater amount of amorphous phases than would have been the case without the specified water injection.

It is a further purpose of the invention to induce the formation of reactive compounds adsorbed onto or formed on the surfaces of the aerosol particulates which, when exposed to flue gas, will bind sulfur oxides to form sulfogypsum accretions, thus scrubbing these compounds from the powerplant flue stream.

Another purpose of the invention is to prevent the formation of nitrous oxide by altering the electrical potential of intermediate gaseous compounds formed during and immediately after combustion.

It is also a purpose of the invention to affect the particle size distribution of the fly ash produced during coal combustion in such a way as to increase the amount of smaller-sized particles, making it more desirable for use as a portland cement admixture.

An additional purpose of the invention is to more nearly complete the post-pyrolysis char burning and thus reduce the unburned carbon ("Loss On Ignition" or "LOI") remaining in the combustion ash products, resulting in ash which is more desirable for use as a cement additive.

A further purpose of the invention is to promote the controlled and deliberate formation of specific minerals that have higher resale values than those typically formed in unaltered combustion processes.

A further purpose of the invention is to control the electrical charge carried by the fly ash to enhance the operation of electrostatic precipitators or filtration equipment such as baghouses or ceramic candle filters commonly used to remove fly ash from the combustion flue stream.

Another purpose of the invention is to more completely combust the hydrocarbon components of the fuel in a combustor and thus reduce the opacity of the emission stream.

An additional purpose of the invention is to alternatively and additionally introduce a spray of atomized cold water at a temperature of not more than 10° Celsius into the flue stream immediately after the point at which the flue stream particulates fall below their condensation temperature in order to cause earlier and more rapid quenching of the fly ash particles and thus increase the relative proportion of amorphous or glass-like phases therein while reducing the proportion of crystalline phases.

Other purposes and objects of the invention are discussed in the descriptions of the experimental results and of the preferred embodiments of the invention.

DESCRIPTION OF EXPERIMENTAL RESULTS ATTAINED WITH THE PRESENT INVENTION

Figure 1:
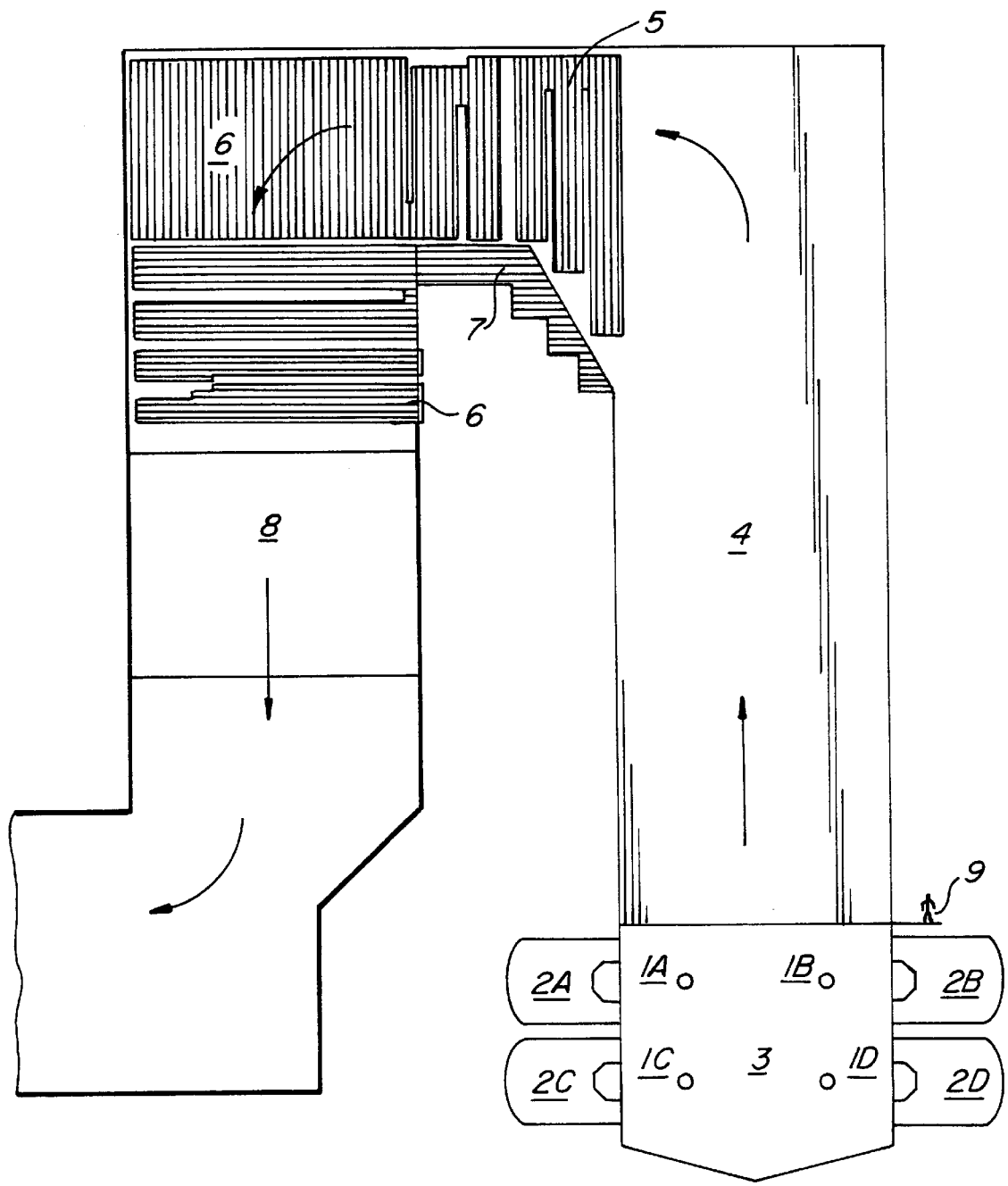
FIG. 1 is a cross-sectional view of a schematically illustrated pressure boiler adapted to make use of the present invention.

The drawings generally illustrate a boiler installation of the type in which the present invention can be used and in which experiments demonstrating the efficacy of the invention were demonstrated. Referring to FIG. 1, a Universal Pressure boiler is shown in which water is injected into areas 1A through 1D immediately beyond the cyclone furnaces (2A through 2D) in a primary combustor (3) where the combustion fireball is formed. As is conventional and well known, the boiler includes a water drum (4), a secondary superheater (5), reheat superheaters (6), a primary superheater (7), and an economizer (8). The large arrows illustrate the direction of flow of the flue gas and ash stream through the boiler.

To better understand the results of high-velocity, free-jet expansion of high-pressure water injected into combustors, experiments were carried out at the down-fired combustor located at Pennsylvania State University's Energy Institute. In these experiments, water pressure was consistently maintained above 23 MPa, and the water temperature ranged from about 36° C. to about 378° C. The fuel used was coal, but other fuel with a greater or equal combustible component can be substituted to determine the improvements in combustion performance, emission gas output and opacity (but not necessarily ash qualities). During both control (benchmarking with no water injection) and water-injection (test) portions of these experiments, baghouse filter samples of the coal-combustion aerosol (in this case, coal fly ash) were collected and analyzed by a private laboratory.

Two types of samples were collected. A first sample type consisted of fly ash recovered from the bin below the baghouse filter. A second sample type consisted of lamellar scale, apparently formed on the surfaces of the filter bags. Because the filter had a ground-state electrical potential, formation of the accretion scales suggests that the particulates that formed them were attracted to the surface of the bags by their tribostatically induced high-voltage electrical potential. Once attracted to the surface of the baghouse filter, the heat and moisture in the flue stream apparently caused the particles to bond or cement into a hard scale. For analytical purposes, the scale was ground to a fine powder with an average particle size of approximately 50 microns and a particle distribution ranging from less than 1 micron to 110 microns, with most particles aggregating around 50 microns.

The combustor in which the experiments were conducted operated at slightly below (−2.5 cm water) atmospheric pressure. Injected water, therefore, moved through the injection nozzles from a high-pressure regime into a low-pressure regime. The atomized water was injected into the hot zone of the flame, the "fireball", in two ways: As liquid water (temperature below 100° C.), it was impinged as a stream against a stainless steel plate angled at 45° to the direction of flow; as gas-phase and supercritical-fluid water, it was injected directly into the fireball from the nozzle. Already under pressures exceeding the approximately 225 $Kg/cm^2$ critical pressure of water, and heated to temperatures greater than 374° C. (the critical temperature of water), the stream became a free-jet of rapidly expanding water molecules and ionized atomic oxygen and hydrogen released into the even-hotter, turbulent combustion process. By using a sufficiently small orifice, the high-temperature water jet could be introduced at nearly supersonic speeds.

All water injection took place above the point in the combustion thermal curve where the minerals present as incombustible contaminants had vaporized (were gaseous) and before the temperature had declined back through their theoretical condensation temperatures. As a result, the gaseous mineral matter, at least briefly, existed as transitory atomic elements or transitory molecular mineral species and was susceptible to profound hydrolization and oxidation reactions in the presence of electrically charged atomic hydrogen, oxygen and molecular water. Due to the Kelvin water droplet electrostatic charging effect, the injected water molecules and atoms, particularly when emerging from supercritical conditions, were highly charged as they jetted into the surrounding fireball, altering the flame equilibrium.

In the supercritical state, water molecules actually do not exist as they would below the critical point (sub-critical water). The supercritical fluid is actually a dense phase of highly compact atoms of hydrogen and oxygen whose molecular bonds are, for all practical purposes, transient or non-existent. As these atomic species emerge through the nozzle into the fireball where temperatures typically approach 1,650° C., the effect of the massive pressure drop to slightly less than 1 bar is offset by the thermal energy imparted to the stream by the flame. As a result, the weak-force molecular bonds do not have an opportunity to form as the distance between the atomic components of the fluid increases. Under these circumstances the water quickly disassociates into monatomic or diatomic hydrogen and oxygen, generally ionized as a result of the Kelvin charging effect. This disassociation will occur regardless of the type of combustion process involved if the water is injected into the hottest part of the flame from the supercritical state. The violent turbulence of the combustion process will quickly permit all of the free hydrogen thus released to re-combust into water, consuming either the ambient oxygen initially present in the flame or the additional oxygen atoms furnished from the rapidly expanding free jet, itself. As a result, this technology may also be used to increase the efficiency of combustion supplying other processes besides boilers, processes including, but not limited to, turbines, internal combustion engines and rocket propulsion systems.

Analysis of minerals formed during the experimental injection demonstrated that variation in water temperature, pressure, quantity on the high end of the nozzle (and consequently the velocity of the resulting free-jet), as well as changes in nozzle diameter and electrical impedance, produced radically different mineralogies in the resulting coal combustion byproducts as well as in the gas components of the flue stream. At temperatures below the critical point of water (373.99° C. and 224.87 $Kg/cm^2$), both ash and scale were typical alumino-silicates. At water temperatures above the critical point, X-ray diffraction demonstrated that a profound shift in mineralogy took lace in both the ash and scale minerals, as is shown in Table 1.

TABLE 1

MINERALOGY BY X-RAY DIFFRACTION

| Sample ID | Major Peak 1 | Major Peak 2 | Major Peak 3 | Major Peak 4 |
|---|---|---|---|---|
| PSU-1 Benchmark Run #1 Ash (no water) | Quartz (SiO2) | Mullite (Al5Si2O13) | Marialite [(NaCa)2SiAl)6(H2))12)] | N/A |
| PSU-2 Cold Water Run #2 Ash | Quartz ($SiO_2$) | Mullite ($Al_6Si_2O_{13}$) | Marialite $[(NaCa)_2(SiAl)_6(H_2O)_{12})]$ | N/A |
| PSU-3 Supercritical Water Run #3 Ash | Quartz ($SiO_2$) | Mullite ($Al_6Si_2O_{13}$) | N/A | N/A |
| PSU-4 Supercritical Water Run #4 Ash | Mullite ($Al_6Si_2O13$) | Quartz (SiO2) | N/A | N/A |
| PSU-1s Benchmark Run #1 Scale | N/A | N/A | N/A | N/A |
| PSU-2s Cold Water Run #2 Scale | N/A | N/A | N/A | N/A |
| PSU-3s Supercritical Water Run #3 Scale | Copper Manganese Oxide ($CuMn_2O_4$) | Chromium Oxide (CrO) | Quartz (SiO2) | Unknown Material |
| PSU-4s Supercritical Water Run #4 Scale | Quartz (SiO2) | Copper Manganese Oxide (CuMn2O4) | Nickel Titanium Oxide (NiTiO3) | Unknown Material |

While the mineralogy of the fly ash and baghouse scale resulting from injection of sub-critical water was normally extremely basic (high pH) when slurried in deionized water, the scale (but not the ash) of the supercritical-water combustion could become extremely acidic, as is shown by Table 2.

TABLE 2

SLURRIED PH OF ASH AND SCALE
Deionized Water Slurry

| Sample | Time | pH |
|---|---|---|
| Baseline, Run #1 | 4 hours | 8.1 |
|  | 8 hours | 8.02 |
|  | 24 hours | 9.25 |
| Ash, Run #2 | 4 hours | 8.02 |
|  | 8 hours | 8.06 |
|  | 24 hours | 8.73 |
| Ash, Run #3 | 4 hours | 8.26 |
|  | 8 hours | 8.2 |
|  | 24 hours | 8.43 |
| Ash, Run #4 | 4 hours | 8.07 |
|  | 8 hours | 8.01 |
|  | 24 hours | 8.52 |
| Scale Sieved from Run #1 | 4 hours | 7.99 |
|  | 8 hours | 8.02 |
|  | 24 hours | 7.87 |
| Scale Sieved from Run #2 | 4 hours | 8.07 |
|  | 8 hours | 7.91 |
|  | 24 hours | 7.9 |
| Scale Sieved from Run #3 | 4 hours | 7.49 |
|  | 8 hours | 7.49 |
|  | 24 hours | 6.66 |
| Scale Sieved from Run #4 | 4 hours | 3.43 |
|  | 8 hours | 3.31 |
|  | 24 hours | 3.29 |

Procedure - Grind sample; add to equal volume of deionized water; check pH

Furthermore, the elemental content was greatly altered as well, as is shown by Table 3.

TABLE 3

BULK ELEMENTAL CONCENTRATIONS

| Wt. % | Run 1 | Run 2 | Run 3 | Run 4 |
|---|---|---|---|---|
| Scale Primary Mineralogy Weight % | | | | |
| Si/Al-rich | 59.37 | 35.36 | 3.42 | 9.01 |
| Fe-rich | 32.10 | 51.59 | 81.63 | 87.31 |
| Ca/S-rich | 2.94 | 4.02 | 0.00 | 0.00 |
| Si-rich | 3.26 | 3.13 | 0.47 | 0.55 |
| Al-rich | 1.21 | 2.37 | 0.80 | 0.29 |
| Misc. | 0.37 | 2.75 | 0.22 | 1.49 |
| Ca-rich | 0.39 | 0.39 | 0.11 | 0.02 |
| Ca/Si-rich | 0.36 | 0.37 | 0.28 | 1.04 |
| Ni-rich | 0.00 | 0.00 | 13.08 | 0.29 |
| Totals | 100 | 100 | 100 | 100 |

TABLE 3-continued

| BULK ELEMENTAL CONCENTRATIONS | | | | |
|---|---|---|---|---|
| Wt. % | Run 1 | Run 2 | Run 3 | Run 4 |
| Ash Primary Mineralogy Weight % | | | | |
| Si/Al-rich | 92.50 | 94.69 | 92.09 | 94.91 |
| Si-rich | 3.05 | 2.08 | 6.08 | 3.46 |
| Ca/S-rich | 1.12 | 0.25 | 0.47 | 0.54 |
| Fe-rich | 2.09 | 2.38 | 0.73 | 0.37 |
| Misc. | 0.32 | 0.26 | 0.16 | 0.06 |
| Ca/Si-rich | 0.40 | 0.15 | 0.13 | 0.23 |
| Ca-rich | 0.41 | 0.18 | 0.22 | 0.40 |
| Al-rich | 0.11 | 0.01 | 0.12 | 0.03 |
| Totals | 100.00 | 100.00 | 100.00 | 100.00 |

Computer - Controlled Scanning Electron Microscopic Count to Statistically Estimate Weight % of Primary Elemental Concentrations It was also demonstrated by analysis of mineralogy and slurry pH changes from basic to acidic and elemental content (from high-silica/aluminum to iron-rich) that, when compared to the control experiment wherein there was no water injection, small proportions of injected supercritical water produced more profound changes in fly ash and scale mineralogy than did larger quantities of either sub-critical or supercritical water. It is postulated that this greater effect was caused by increased Brownian motion of the water molecules at the higher injection velocity occasioned by the smaller nozzle. This increase permitted more material to come into contact with the walls of the nozzle and thus increased the Kelvin electrical charging.

When water was injected from sub-critical conditions, the ash and scale were not self-cementing, but when the water was injected at the highest velocity supercritical conditions, the scale (but not the ash) loosely self-cemented in water. Such acidic self-cementing material suggests the potential to use such scale in place of portland cement or other hydraulic molding or cementing compounds such as sorel cement or plaster of paris. The highest velocity produced the most profound changce in the mineralogy of the scale, apparently because the Kelvin electrical charging of the atomic hydrogen and oxygen was most profound under such conditions. The "extra" electrons so acquired passed into the condensing flue stream and wrought major mineralogical transformations as compared to the lower velocity jets. These ionized reduction reactions produced the scale containing a high quantity of ferric matter.

Water injection also improved post-pyrolysis char-burning, reducing LOI present in the fly ash and improving the heat output of the combustion process. Atomized water injection from sub-critical temperature regimes resulted in approximately a 50% reduction in LOI. Water injection above the critical temperature resulted in a further 50% (or greater) reduction in LOI. The greatest reduction in LOI (as compared to the control experiment wherein no water was injected) occurred when the velocity of the jet was highest and the ratio of water to coal-feed was lowest, as is shown by Tables 4 and 5. Again, this is a function of the Kelvin charging of the passing water droplets.

TABLE 4

| Loss On Ignition (LOI) Average LOI | | |
|---|---|---|
| Baseline, Run #1 | PSU-1 | 2.79 |
| Cold water, Run #2 | PSU-2 | 1.78 |
| Supercritical water, Run #3 | PSU-3 | 1.37 |
| Supercritical water, Run #4 | PSU-4 | 0.79 |
| Scale sieved from Run #1 | PSU-1S | 9.08 |
| Scale sieved from Run #2 | PSU-2S | 12.47 |
| Scale sieved from Run #3 | PSU-3S | 11.14 |
| Scale sieved from Run #4 | PSU-4S | 10.32 |

TABLE 5

| | | 19/31 Flow Rates and Velocities | | | | | |
|---|---|---|---|---|---|---|---|
| Run Identification | Water/Coal × 100 | Nozzle Diameter in mm | Average Water Temperature in Deg. C. | Water Pressure in grams/cm$^2$ | Flow Rate in grams per Hour | Jet Velocity in Meters per Second | Jet Velocity in Miles per Hour |
| (Conrol) 1 | n/a | n/a | n/a | n/a | n/a | n/a | n/a |
| 2 | 7.70 | 0.38 | 31.11 | 146.47 | 1714.57 | 32.39 | 72.43 |
| 3 | 10.60 | 0.09 | 380.56 | 1592.64 | 1809.82 | 138.84 | 310.40 |
| 4 | 6.40 | 0.05 | 392.78 | 1651.72 | 1143.05 | 242.988 | 543.20 |

Figure 3:
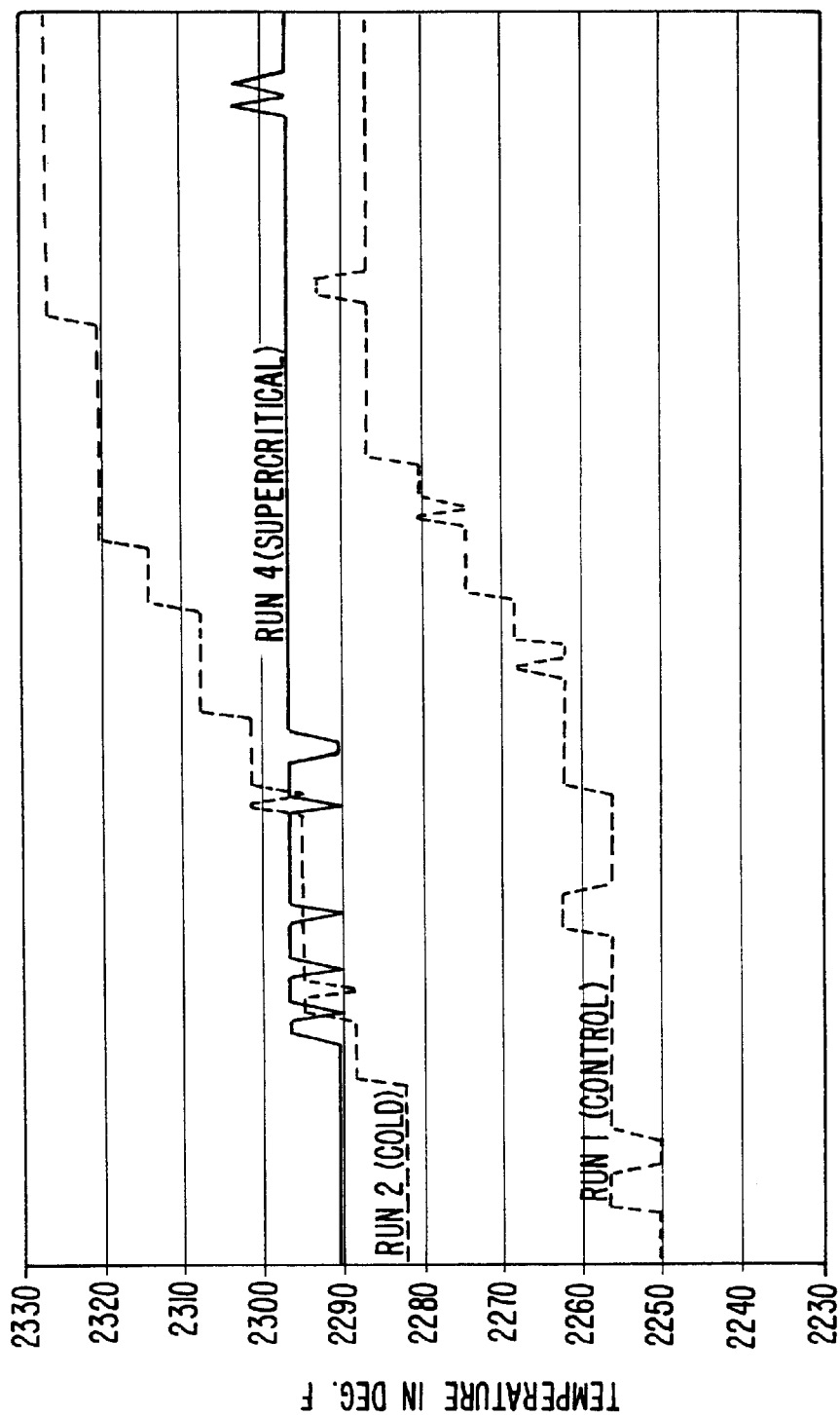
FIG. 3 is a chart which illustrates the increase in thermal output attained with the present invention.

Thermal output of the combustion process was improved from about 5% (for liquid water injection) to as much as 10% (for water injection under supercritical conditions), as can be seen in FIG. 3.

A portion of this improvement is attributable to the burnout of the remaining carbon (char-burning). Another portion of the noted improvement appears to result from the introduction of water as a rapidly expanding free-jet into the near-plasma state of the combustion fireball, causing at least partial and probably complete dissociation of the water molecule into ionized atomic hydrogen and oxygen. In the presence of gaseous elements coalescing into aerosols, these ionized elements oxidize (burn) or experience reducing reactions creating several mineralogically unstable intermediate states resulting in near-completion of the char-burning and finally (through hydrolysis or reduction of the silicates and other metallic elements present in the combustion gases) forming minerals and amorphous materials not generally created during the condensation of such mineral-matter aerosols in the absence of water injection. Of particular significance is the fact that net oxygen content of the flue stream does not show any proportional increase as a result of water injection, while the slurries of ash and scale products grew increasingly less basic and finally became acidic as higher velocity, higher temperature and more highly charged water was injected, further supporting the belief that water is dissociated and freed to recombine into novel mineral forms (including acidic ones, see Tables 1 and 2), an indication of accelerated rates of both oxidizing and reducing reactions.

Coal fly ash chemistry and morphology differ greatly from power plant to power plant and are, for the most part, a function of the chemistry of the coal feed stream itself and the combustion and exhaust flue stream thermodynamics.

The broad range of combustion filing configurations and resulting burning processes, as well as the mineral-matter contaminants present in different coal feed streams, preclude a generalization about free-jet injection parameters. Instead, in practical applications, it is easier to apply heuristics to the process and "tune" the free-jet injection. This is accomplished by varying one or more of the pressure, temperature and flow rate through the injection nozzle and sampling the resulting flue stream and mineral-matter byproducts (gas and ash), adjusting the water jet conditions until desired and/or optimized results have been attained. Samples can be collected at locations proximate to the injection point by means of suction probes or Cegrit sampling.

The combustion-transformation of mineral matter results in "ash" materials that are actually aerosol condensates, beginning their mineral existence in a gaseous phase before coalescing into transitional, solid or liquid mineral phases and finally settling into stable or metastable minerals that include both crystalline and amorphous phases. Most coal combustion fly ash can be characterized as being primarily siliceous spherical aerosol particulates, often containing varying amounts of nucleated carbon, iron, calcium, aluminum, fluorine, chlorine, sulfur and many other metal oxide species. Portland cement applications such as concrete do not tolerate significant amounts of carbon. For example, ASTM C-618 (85) standards do not permit the use of ash with a carbon content in excess of 3% as an admixture. In practice, however, ash streams with carbon contents over 1% generally are of little commercial value as cement admixtures. Adjustment of the injection free-jet permits the nearly complete combustion of all carbon and results in ash that has extremely low LOI, e.g. no more than 1% by weight of the ash.

As modem combustors are upgraded to reduce NOx emissions—called "low-$NO_x$ burners"—the carbon content in the ash generally increases dramatically, making these systems less efficient in terms of coal consumption and making the resulting ash products less valuable and often completely unsuitable as cement additives. Tuning the variables of high-velocity water free-jets injected into such new burners has the salutary effect of increasing the combustion efficiency without increasing (and in some cases even further decreasing) the production of $NO_x$ emissions. All that is required is to "tune" the water injection by changing nozzle size, pressure and/or temperature, thereby altering the velocity, temperature and volume of water being injected into the fireball.

A significant aspect of the process of the present invention investigated in the experiments is the charging or ionization of the supersonic free-jet that seems to take place because of what is known as the Kelvin water droplet or Kelvin electrical effect. In early experiments, Lord Kelvin determined that individual droplets of water (not continuous streams) discharged through orifices selectively assumed a high negative electrical potential. This effect is thought to account for the high voltage potential of storm clouds that produce lightening.

It has long been known and demonstrated that the addition of water on the "cold side" of a boiler, where flue stream temperatures are approximately 300° to 450° F., can improve the performance of an electrostatic particulate precipitator. The present invention further improves that performance, due to the more energetic state of the coalescing particulates at higher temperatures. As a consequence, introduction of water under the conditions discussed herein will result in a reduction in opacity in flue streams from coal combustors and other types of furnaces including, but not limited to, electric open-hearth, basic oxygen and similar steel furnaces equipped with electrostatic precipitators, and the like.

DESCRIPTION OF THE PREFERRED EMBODIMENTS

Referring to FIG. 1, in a first embodiment, water is discharged into the hottest part of the primary combustion zone ("fireball" or "flame front") of a boiler at the rate of between 1.5% and 3% of the weight of the fuel feed, thereby improving the overall performance of a boiler as discussed above. In a typical combustor (e.g. a burer or a furnace), fuel is combined with air, or with hyper-oxygenated air or pure oxygen, and ignited. The fuel may be solid, liquid, slurry or gaseous, such as water/coal slurry, sewage sludge, municipal solid waste, waste or recycled paper, benzine, gasoline, wood products (including chips fiber, pellets and processed wood), diesel oil, methane gas or natural gas, and other fuels.

In accordance with the invention, water in the form of one or more rapidly expanding free-jets is injected into the hottest part of the flame. The water may be in either a sub-critical or a supercritical state. Generally, it has been found that the injection of supercritical water to form rapidly expanding free-jets, at velocities exceeding the speed of sound in the flame itself, produces the most profound improvements in the operation of the boiler.

Figure 2:
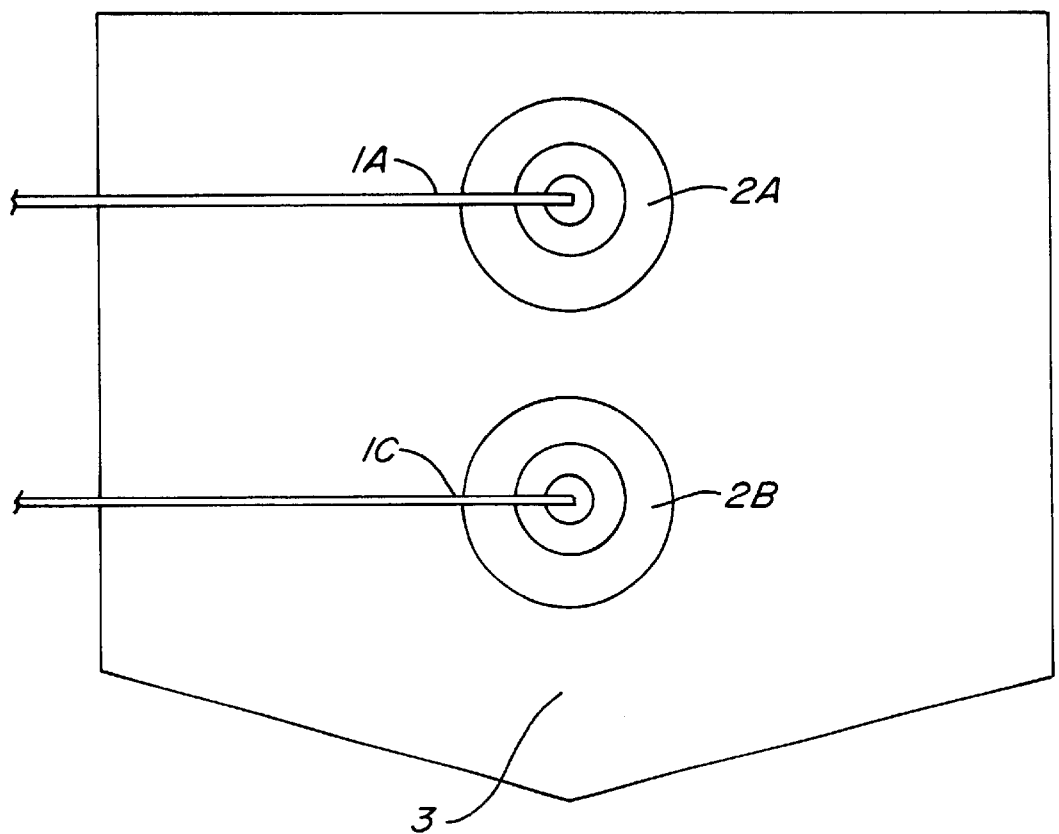
FIG. 2 is a schematic illustration of a hot, pressurized water injector for use in the present invention.

An appropriate "water discharge assembly", schematically shown in FIG. 2, is used to inject the water into the fireball. The water for the discharge array is supplied from a service water supply ("cold water") and/or from a "T" at the economizer ("hot water") drain lines, or from any heater capable of providing water at temperatures exceeding the critical temperature. Electrically operated valves and backflow preventers control water temperature (mixture of hot and cold water). A microprocessor is preferably used for continually adjusting the valves. Pressure is provided by a pump, also controlled by the microprocessor. The flow rate and waterjet velocity are adjusted by selecting and installing appropriately sized and shaped injector nozzles. Larger orifices produce higher flow rates and may be used to lower the velocity of the jet. Smaller orifices permit lower flow rates and higher jet velocities.

If sub-critical water is utilized, the water jet must be impinged upon an, angled plate to atomize and direct the stream into the fireball. If supercritical water is used, such deflector is not required.

By monitoring pollutants such as $NO_x$, $SO_x$ and opacity in the emission stream from the boiler, the injection system can be adjusted to reduce them. Experiments have shown that supercritical water injection at supersonic velocities can effect significant improvements in stack emissions. This appears to be the result of the formation on the surface of the fly ash particulates of accretions which contain significant amounts of sulfur compounds, suggesting that at least some of the sulfur oxides have been fixed as anhydrate and scrubbed from the flue stream. Since most boiler operators routinely monitor these emissions, water injection conditions can be adjusted on an ongoing basis to produce the greatest overall benefits in terms of minimizing undesirable emissions and optimizing boiler efficiency for a given fuel feed and burner load. By adjusting water volume, jet velocity, temperature and pressure, a combination can thereby be reached which will be nearly optimal for a given boiler configuration and fuel combination.

In another embodiment of the present invention, one or more jets of high-velocity supercritical state water are introduced into the fireball, causing subsequent coalescing of a small but significant fraction of the gaseous constituents into particulates which are rich in conductive metals, as can be discerned from Tables 1 and 2. Here, water injection is reduced to less than 1.5% of the weight of the fuel feedstock. The minerals forming these particulates are more electrically conductive than the remainder of the ash or than ash produced without benefit of supercritical supersonic waterjet injection. Since they are more conductive, these particulates may be preferentially collected in the first field of an electrostatic precipitator. Since these particulates readily cement when combined with water, they offer the potential to act as acid-based portland cement substitutes.

With the removal of acidic particulates from the ash stream, the remainder of the ash is rendered higher in pH (more basic) and thus is more suitable for use as a cement admixture.

As molecular water passes from the nozzle orifice of the water injection array, a negative electrical potential is imparted to the expanding water free-jet. This is known as the Kelvin electrical effect and is most noticeable where the orifice is made from a non-conductive material such as sapphire or ruby. Higher velocities resulting from higher pressure water ejected from smaller orifices result in more rapidly expanding molecular free-jets. Typically a velocity of not less than 565 mn/second is desirable for most combustors.

According to a further embodiment of the invention, water is injected into the fireball or flame front at supercritical conditions to disassociate the water into its elemental constituents, which are then recombined into water, igniting more of the latent hydrocarbon. The water injection results in a hotter flame, producing enhanced thermal efficiency of the combustion process, increasing the amount of carbon burned during the combustion process, and correspondingly reducing the amount of fuel consumed, thereby resulting in significant fuel and cost savings. In this situation, water is disassociated into atomic hydrogen and oxygen. Such disassociation may be triggered either by metal catalysis occasioned by the presence of certain metals in the coal mineral matter interacting with the energetic molecular water droplets, as a result of the Kelvin electrical charging taking place when the water exits the orifice as high-velocity water molecules (molecular droplets) into the energetic, near-plasma conditions of the fireball, by the rapid expansion of the molecular free-jet, or by a combination of two or more of them. Additional heat is released when the hydrogen and oxygen so formed interact with each other to recombine (burn) back into water and further when the now higher temperature carbon combusts more completely as well. This is particularly suitable for use with solid fuels, including, but not limited to, coal-, peat-, wood- and municipal solid waste-fired combustion processes. It can also be used, however, in the combustion of gaseous and liquid fuels such as natural gas, coal/water slurries, fuel oil, kerosene, gasoline or municipal sludge.

In another embodiment of the present invention, a second, cold-water atomizer/injector is added just downstream of the location in the boiler where the temperature of the particulates has fallen below the condensation point. The additional atomizer/injector water rapidly quenches the condensate particles, thus reducing the formation of crystalline phases that result when the particles cool more slowly. This second atomizer/injector is preferably located downstream from the first injector where the particulates are fully formed and are just below their fusion temperature or melting point. In addition to resulting in lower amounts of LOI (typically less than 0.6% by weight for supercritical water injection and less than 2% for sub-critical water injection) remaining in the ash, the fact that this embodiment produces ash with significantly increased content of amorphous phases makes the resulting combustion byproduct more desirable as a pozzolanic cement admixture.

The injection location as well as the water volume, velocity and nozzle type (conductive or non-conductive) are best determined experimentally for each combustor or boiler unit, taking into consideration the unit's physical design and the ultimate analysis, mineral-matter (contaminant) proportion, and composition in the coal or other fuel. In this context, the phrase "ultimate analysis" means the fuel content/value analysis performed on the coal or other fuel. In this embodiment as well, the injection velocity is preferably at least that of the speed of sound within the fireball.

Because the location of the second atomizer/injector must be individually determined for each combination of boiler, coal and non-combustible mineral-matter contaminants, there are no universally applicable preferred locations for the atomizer/injector.

In yet a further embodiment of the invention, the injection of water as a high velocity stream causes reactions to proceed along a different path from normal combustion, resulting in reduced emissions of $NO_x$, $SO_x$ and unburned carbon and cleaner emissions with less opacity. The electrical charges imparted to the particulates by the introduction of water into the combustion process decreases their apparent resistivity and improves efficiency of particulate collection, especially by electrostatic precipitators, but also in baghouses and candle filters.

SUMMATION

From the foregoing, it should now be apparent that according to this invention, water molecules are injected into the primary combustor fireball of a coal combustor at a high velocity to form a high-velocity free-jet with a negative electrical potential. The water temperature and pressure, the electrical polarity of the injector, the temperature of the flue stream at the injection point, and the velocity of the free-jet (which establishes the rate of expansion) combine to determine the resultant effects of the injection. Large-scale experimental work has shown that high-velocity water injected into the fireball from a high-pressure and often high-temperature regime gives rise to numerous and variable beneficial results. The beneficial effects are significantly more pronounced when the water temperature and pressure exceed the critical point of water and the velocity of the jet is nearly at or greater than the theoretical speed of sound within the fireball at boiler atmospheric pressures and considering the temperature of the surrounding medium. Based upon empirical data, four factors, then, are postulated to contribute to the effects isolated by this experimental work:

1. an increased negative electrical potential of both flue particulates and gases, apparently resulting from the "Kelvin water droplet effect", as water molecules and even individual atoms are ionized at the injection point and during subsequent energetic expansion of the high-velocity jet coupled with a violent pressure drop;
2. high temperature of injection environment (near-plasma conditions of the combustion fireball);
3. atomic dissociation of the water molecule; and
4. high-velocity free-jet expansion augmenting the Brownian motion of the charged, atomized water and/or atomic hydrogen and oxygen injected into very high-temperature regimes consisting of elemental and molecular gases and/or vapor containing high concentrations of meta-stable compounds or components of electrically resistive mineral species.

In a preferred embodiment, the injection apparatus consists of one or more small-diameter tube(s) and nozzle(s), with interchangeable orifices to permit choking control over velocity and quantity of injection water, and the injected water is directed into the primary combustion zone. The injection tube is supplied with water under pressure of no less than 225 Kg/cm², passes through the tube, and escapes through the nozzle orifice. At sub-critical temperatures the water emerges as a jet of atomized droplets that may be impinged upon a deflector plate directing the droplets into the center of the fireball. At pre-injection water temperatures and pressures at or exceeding water's critical point (supercritical water), the water emerges as a molecular free-jet. The free-jet dissociates into atomic hydrogen and oxygen in the near-plasma environment of the fireball and no deflector plate is required.

The ash produced by a coal-fired power plant is of two types: heavy ash that forms argillaceous clumps and collects in the lowest part of the furnace (bottom ash), and finely particulate lightweight ash (fly ash) that is swept along by the flue gas stream to be collected by an electrostatic precipitator, in the fabric filters of a baghouse, or in the pores of ceramic candle filters. The process of the present invention alters the mineralogy of both types of ash and helps combust most if not all LOI before it can contaminate the ash stream.

Experiments have demonstrated that water injected from the critical state produces more profound and beneficial effects than "cold" service water. Prior to fully practicing the processes of the present invention, it is recommended to begin without a cold water component in the system and to initially use water at a temperature of approximately 382° C. and a pressure of 226 Kg/cm². The water flow rate (by weight) should initially be set to equal about 1.5% of the weight of the coal (or other fuel) feed stream (including any mineral-matter contaminants). The injected free-jet velocity should initially be no less than about 565 meters per second. To maintain the desired injection velocity while maintaining the injection volume ratio of 1.5%, multiple nozzles may be necessary.

Nozzles can be made of conductive metals or of non-conductive materials such as corundum or synthetic gemstones. This permits control over the Kelvin water droplet effect. Depending upon the type of particle filter or precipitator in use, it may be desirable to produce particles with positive or negative electrical potential. Changing the material of the nozzle from conducting to insulating will permit this.

Before commencement of supercritical or cold water injection, flue gas composition and opacity should be monitored to establish baseline (control) standards. LOI content and principal mineralogy of fly ash should also be established prior to commencement of injection. All ash bins should be emptied and cleaned prior to injection. If baghouses are used for particulate removal, then they should be pulsed and thoroughly cleaned. If electrostatic precipitators are employed, collectors and electrodes should be rapped to remove deposits and the bins should be emptied and cleaned.

Once injection commences, it should be continued for at least one hour before collecting samples and changing any variables. Flue gas composition and opacity monitoring should be regularly reported to the operator from the moment injection begins. On an hourly basis, precipitator or baghouse efficiency and LOI percentage should be checked and recorded. With this information, it is possible in a relatively few iterations to tune the system to achieve a stable, high-performance high-velocity free-jet injection configuration—temperature, pressure, velocity, volume and charge—that will produce the above-described significant reductions in LOI while increasing thermal output.

Depending upon the elemental content of the mineral-matter contaminants in the coal feed stream and the firing configuration of the boiler, many plants will be able to produce reactive ash which, when combined with water, can be substituted for portland cement. To successfully fall into this category, when slurried in an equal volume of deionized water, the ash liquor should, within five minutes, show an average pH either below 1.8 or greater than 13. For purposes of this analysis, ash samples should be collected from the baghouse or precipitator bins. Throughout the initial injection run, the boiler should be carefully monitored for fouling and slagging, since each coal feed stream offers different potential for these problems due to differing mineralogies. Electrostatic precipitators should be closely watched for changes in collection efficiency as well, and for the same reasons.

What is claimed is:

1. A method of improving the performance of a furnace comprising the steps of combusting coal in a combustor to generate a high temperature flame; increasing at least one of the temperature and the pressure of water sufficiently above ambient conditions so that fly ash formed during combusting becomes cementitious; and thereafter injecting a free-jet of the water into the flame.

2. A method according to claim 1 wherein the step of increasing comprises increasing the temperature and pressure of the water above supercritical conditions.

3. A method according to claim 1 wherein the step of increasing comprises increasing the temperature and pressure of the water to at least supercritical conditions for the water.

4. A method according to claim 1 including the step of giving the free water jet a negative electric potential before it reaches the flame.

5. A method according to claim 1 wherein the step of increasing comprises increasing the pressure of the water to at least about 225 Kg/cm².

6. A method according to claim 1 wherein increasing comprises increasing the temperature and pressure of the water to subcritical conditions for the water, and including the steps of impinging the free water jet on a deflector before the free-jet reaches the flame.

7. A method according to claim 1 including the step of initially providing the free water jet with a flow speed of at least about 565 m/sec.

8. A method according to claim 1 including the step of injecting multiple free water jets into the flame.

9. A method according to claim 1 including the step of determining the temperature and pressure for the increasing step by initially combusting the coal without injecting the free water jet; monitoring at least one of gaseous emissions and combustion byproducts generated during combusting the coal; and thereafter injecting a free water jet into the flame, varying at least one of the temperature, pressure and flow rate for the water jet while continuing the monitoring step until a desired characteristic for at least one of the emissions and the byproducts has been observed, and thereafter performing the increasing step at a value for the temperature, pressure and flow rate of the water which forms the free-jet to maintain the desired characteristic.

10. A method of enhancing the thermal efficiency of a combustion process comprising the steps of combusting fuel in a combustor to generate a high temperature flame; increasing the temperature and pressure of water above ambient temperature and pressure; thereafter injecting the water as a free-jet into the flame; whereby the thermal efficiency of the process is enhanced by reducing the carbon content in at least one of gaseous emissions and combustion byproducts generated during combusting and correspondingly increasing the carbon that is combusted in the process; and including splitting water molecules into hydrogen and oxygen and thereafter recombining the hydrogen and oxygen into water molecules during the injecting and combusting steps to thereby generate a resulting net heat gain.

11. A method according to claim 10 wherein the step of increasing comprises increasing the temperature and pressure of the water to above supercritical conditions before injecting the water into the flame.

12. A method according to claim 10 wherein the combusting step comprises combusting coal.

13. A method according to claim 10 wherein the combusting step comprises combusting a liquid fuel.

14. A method according to claim 10 wherein the combusting step comprises combusting a gaseous fuel.

15. A method of enhancing the thermal efficiency of a combustion process comprising the steps of combusting fuel in a combustor to generate a high temperature flame; increasing the temperature and pressure of water above supercritical conditions; and thereafter injecting the water as a free-jet into the flame; whereby the thermal efficiency of the process is enhanced by reducing the carbon content in at least one of gaseous emissions and combustion byproducts generated during combusting and correspondingly increasing the carbon that is combusted in the process.

16. A method according to claim 15 wherein the step of injecting comprises injecting supercritical water into the flame formed in a turbine.

17. A method according to claim 15 wherein the step of injecting comprises injecting supercritical water into the flame formed in an internal combustion engine.

18. A method according to claim 15 wherein the step of injecting comprises injecting supercritical water into the flame formed in a rocket propulsion system.

19. A method according to claim 15 including splitting water molecules into hydrogen and oxygen and thereafter recombining the hydrogen and oxygen into water molecules during the injecting and combusting steps to thereby generate a resulting net heat gain.

20. A method according to claim 15 including splitting water molecules into hydrogen and oxygen and thereafter recombining the hydrogen and oxygen into water molecules during the injecting and combusting to thereby generate a resulting net heat gain.

21. A method according to claim 15 wherein the combusting step comprises combusting coal.

22. A method according to claim 15 wherein the combusting step comprises combusting a liquid fuel.

23. A method according to claim 15 wherein the combusting step comprises combusting a gaseous fuel.

24. A method of improving the performance of a furnace comprising the steps of combusting a fuel in a combustor to generate a high temperature flame; increasing at least one of the temperature and the pressure of water above ambient conditions; determining the temperature and pressure for the increasing step by initially combusting the fuel without injecting a free water jet into the flame; monitoring at least one of gaseous emissions and combustion byproducts generated during combusting the fuel; and thereafter injecting a free water jet into the flame, varying at least one of the temperature, pressure and flow rate for the water jet while continuing the monitoring step until a desired characteristic for at least one of the emissions and the byproducts has been observed, and thereafter performing the increasing step at a value for the temperature, pressure and flow rate of the water which forms the free-jet to maintain the desired characteristic.

25. A method according to claim 24 wherein the step of increasing comprises increasing the temperature and pressure of the water above supercritical conditions.

26. A method according to claim 24 wherein the step of combusting comprises combusting coal; and wherein the step of increasing comprises increasing the temperature and pressure of the water sufficiently so that fly ash formed during combusting becomes cementitious.

27. A method according to claim 24 including the step of giving the free water jet a negative electric potential before it reaches the flame.

28. A method according to claim 24 wherein increasing comprises increasing the temperature and pressure of the water to subcritical conditions for the water, and including the steps of impinging the free water jet on a deflector before the free-jet reaches the flame.

29. A method according to claim 24 wherein the step of injecting comprises injecting supercritical water into the flame formed in a turbine.

30. A method according to claim 24 wherein the step of injecting comprises injecting supercritical water into the flame formed in an internal combustion engine.

31. A method according to claim 24 wherein the step of injecting comprises injecting superclitical water into the flame formed in a rocket propulsion system.

* * * * *